United States Patent [19]

Hoffmann et al.

[11] Patent Number: 4,857,242

[45] Date of Patent: Aug. 15, 1989

[54] METHOD FOR MANUFACTURING A LIGHT WAVEGUIDE CABLE

[75] Inventors: Thomas Hoffmann, Augsburg; Ernst Mayr, Starnberg; Helmut Saller, Munich, all of Fed. Rep. of Germany

[73] Assignee: Siemens Aktiengesellschaft, Berlin and Munich, Fed. Rep. of Germany

[21] Appl. No.: 198,757

[22] Filed: May 25, 1988

[30] Foreign Application Priority Data

May 27, 1987 [DE] Fed. Rep. of Germany ....... 3717852

[51] Int. Cl.$^4$ ............................................. B29D 11/00
[52] U.S. Cl. .................................... 264/1.4; 264/1.5; 264/22; 264/174
[58] Field of Search ................... 264/1.5, 1.4, 22, 173, 264/174

[56] References Cited

U.S. PATENT DOCUMENTS 4,480,898 11/1984 Taylor ................................. 264/174
4,641,916 2/1987 Oestreich et al. ................ 250/96.23

FOREIGN PATENT DOCUMENTS 125710 11/1984 European Pat. Off. ............. 264/1.5
21012 2/1985 Japan .................................... 264/1.5

*Primary Examiner*—James Lowe

[57] ABSTRACT

An improved method of manufacturing a light waveguide cable having a light waveguide bundle of at least one lead with the filling material received in an outer sheath characterized by the method including applying an outer sheath on the bundle with the filling material, said sheath being of a material at least partially light permeable and cross-linking the filling material by irradiating the sheath with light radiation, such as ultraviolet light, which will pass through the sheath to cross-link the filling material.

14 Claims, 1 Drawing Sheet

METHOD FOR MANUFACTURING A LIGHT WAVEGUIDE CABLE

BACKGROUND OF THE INVENTION

The present invention is directed to a method for manufacturing a light waveguide lead or cable, wherein at least one light waveguide together with at least a partially cross-linkable filling compound are introduced into a sheath.

U.S. Pat. No. 4,641,916, whose disclosure is incorporated by reference and which was based on German Application No. 34 00 605, discloses a light waveguide provided with a cushion layer, which is accommodated inside of a sheath of hard material. A glide layer, that exhibits carrying properties and is preferably composed of a cross-linkable or thixotropic material, is provided between the hard sheath and the cushion layer.

When the cross-linkable filling compounds are used, an application of energy is usually needed for the implementation of the cross-linking process. For example, one can work under elevated outside temperature conditions in order to provide the required energy on the basis of the correspondingly high temperature. Otherwise, the production line must be established, for example, with long paths so that an adequate cross-linking can be achieved at lower temperatures, for example before the lead or cable is wound onto drums.

SUMMARY OF THE INVENTION

The present invention is directed to provide a method in which the application of energy can be introduced for at least partially cross-linking the filling compound in an especially simple way. This object is accomplished in an improvement in the method for manufacturing the light waveguide cable or lead by providing at least one light waveguide, providing at least partially cross-linkable compound, introducing the light waveguide and the cross-linkabe compound together into a sheath. The improvements are that the sheath is formed of at least a partially light permeable material and the method further includes irradiating the sheath with light energy immediately following the assembly of the protective sheath with the light passing through the sheath to partially cross-link the filling compound.

The cross-linking can be executed after the application of the protective sheath on the basis of a suitable selection of the material of the sheath so that at least a partially light permeable material is used. In this condition, the filling compound no longer drips or runs off and the radiated means, moreover, can be introduced into the manufacturing sequence in a simple way without constraints.

Polyetherimide, polycarbonate, for example sold by Bayer AG under the tradename "MAKROLON 3118", polyamide, for example sold by Emser Werke AG under the tradename "GRILAMID TR 55" and PEEK are preferably suited as materials for the protective sheath.

Other features and advantages of the present invention will be readily apparent from the following description of the preferred embodiments, the drawings and claims.

DESCRIPTION OF THE PREFERRED EMBODIMENTS

Figure 1:
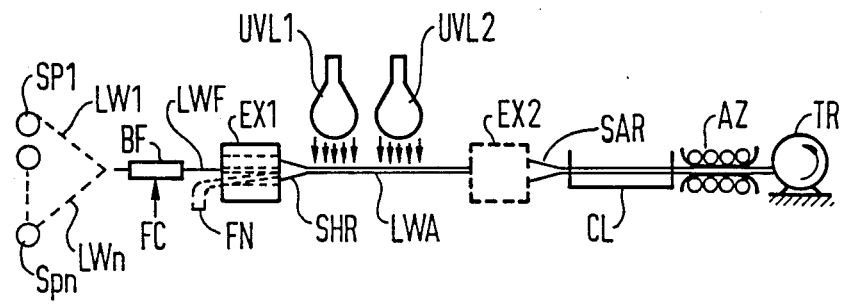
FIG. 1 is a schematic illustration of a production line forming a light waveguide lead or cable in accordance with the present invention.
Figure 2:
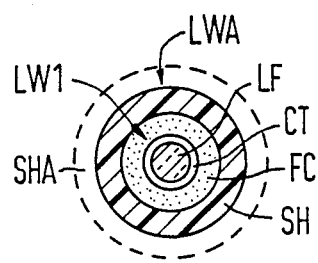
FIG. 2 is a cross sectional view through a light waveguide lead or cable manufactured in accordance with the present invention.

The principles of the present invention are particularly useful for producing a light waveguide lead or cable, which is generally indicated LWA in FIG. 2. The light waveguide cable LWA has a hard outer protective sheath SH that is composed of an entirely or partially light permeable material. In the present example of FIG. 2, it is assumed that a single optical fiber LF, provided with a coating CT, is arranged on the inside of the light waveguide cable LWA as a light waveguide LW1. However, as indicated and discussed with regard to FIG. 1, the cable may have a bundle of a plurality of light waveguides LW1-LWn in the inside of a common protective sheath SH. The filling compound FC, which serves as a glide layer, is provided between the light waveguide LW1 and the sheat SH so that the light waveguide LW1 is displaceable or movable relative to the protective sheath, at least to a slight extent. Compensation events can be executed better in this way without damaging the sensitive optical fiber LF.

In order to prepare the cable LWA, a series of light waveguides or fibers LW1-LWn are provided on a series of reels SP1-SPn, as shown in broken lines in FIG. 1. These light waveguides are taken from the supply reels SP1-SPn and supplied to a coating means BF in which a filling compound FC is supplied via a corresponding pipe line, as indicated by the arrow. This filling compound FC, for example, can be applied to the light waveguide bundle as it is being conducted through the pipe in which the filling compound is being introduced from a side of the pipe. This light waveguide bundle, with the filling compound FC, leaves the device BF as a coated bundle LWF. This bundle enters into a bore of an extruder head EX1, whose output end extrudes a stretching cone SHR, which is later drawn to the desired diameter by a stretching process to such an extent that it forms a hard outer protective sheath SH, as shown in FIG. 2.

As soon as the stretching cone SHR for the protective sheath SH has been drawn down to the desired, ultimate diameter of the protective sheath, one or more illumination means UVL1 and UVL2, whose radiation preferably operates in an ultraviolet range, is directed onto the light waveguide cable LWA. Since the outer protective sheath SH is at least partially light permeable, the light also proceeds through the sheath into the inside and impinges on the filling compound FC, which serves as a glide layer. This will cause the filling compound to be cross-linked to the desired degree, and this is capable of being accomplished on the basis of the intensity of the radiation of the light sources UVL1 and UVL2 in a simple way in combination with the rate of travel. The cross-linking is, thereby, expediently carried out to such an extent that the initially, practically liquid filling compound is at least partially cross-linked. The viscosity of the filling compound FC, when filling, should be very low and should, preferably, lie between 10 m Pa s and 30,000 m Pa s. In the final or cross-linked condition, by contrast, the viscosity of the filling compound is substantially higher and, namely, lies in a range of between $10 \times 10^3$ m Pa s and $2 \times 10^6$ m Pa s (milli Pascal second).

When the filling compound is especially thin-bodied, it is recommended to replace the coating means BF in FIG. 1 and use a filling needle FN, which is illustrated in broken lines in the FIG. 1 and which extends into the extruder EX1. The outlet opening of this filling needle FN is shown, and is roughly in the region of the stretching cone SHR or shortly before the stretching cone.

UV-cross-linkable materials, preferably, come into consideration as the materials for the filling compound FC. In particular, an ultraviolet silicone resin that is sold and known under the order name "RC 640" by the Goldschmitt Company, will make up approximately 95% of the weight of the filling compound. The remaining 5% is formed by a photo initiator sold under the order name "A2" by the Goldschmitt Company. As needed, it is expedient to use an oil, particularly a silicone oil, in the mixture for changing the viscosity, and an example of such a silicone oil is sold under the tradename "AK1000" by Wacker Chemie. Other material that can be used as a filling compound FC and, thus a glide layer, are sold by Siemens AG under the order names "CS24" and "C38".

Suitable materials for the protective sheath SH with adequately good light-transmitting properties are selectd from a group consisting of polyetherimide, polycarbonate, polyvinyl chloride and polyamide. Polyamides, polyvinyl chloride, polyetherimides and polycarbonates are suitable materials for the sheath SH. The wall thickness of the protective sheath SH should, therefore, be expediently selected between 0.1 mm and 2 mm.

The filling compound FC serves as a glide layer. It should have its properties modified by the cross-linking process so that the material obtained in the final result, i.e., after the cross-linking which is obtained by an illumination device UVL1 and UVL2 can still have its properties determined by a viscosity measurement but it should not be cross-linked to such a point that it becomes an elastomer. A complete cross-linking elastomer would too-firmly embed the sensitive light waveguide LW1, whereas an excessively liquid filling compound has a tendency to still drip out of exposed locations, such as splicing locations.

When a further protective sheath SHA, as indicated in broken lines in FIG. 2, is to be applied to the protective sheath SH, the light waveguide cable LWA passes through a second extruder EX2, which applies the second or additional outer sheath SHA in the form of a stretching cone SAR. After the second outer sheath SHA has been stretched down to the desired final outside diameter, the light waveguide lead or cable can transverse a cooling basin CL and is subsequently applied via conveyor means in the form of, for example, a caterpillar pull-of device AZ to a drum TR where the light waveguide cable or lead is wound.

When the two layers SH and SHA are applied, then the illumination means UVL1 and UVL2 are arranged before the second extruder EX2. In other words, the application of light is only carried out through the innermost protective sheath SH. Of course it is, thus, no longer necessary that the outer or second protective sheath SHA be composed of a light permeable material.

Although various minor modifications may be suggested by those versed in the art, it should be understood that we wish to embody within the scope of the patent granted hereon all such modifications as reasonably and properly come within the scope of our contribution to the art.

We claim:

1. A method for manufacturing a light waveguide lead having at least one light waveguide which is provided with an outer coating and which is disposed in an outer protective sheath, said method comprising the steps of providing at least one light waveguide with an at least partially cross-linkable filling compound, extruding a protective sheath on said waveguide with the filling compound on it, said protective sheath being fabricated of at least a partially light permeable material, drawing the extruded sheath into a stretch cone with the cone having a small end of the desired diameter for the sheath, hardening the protective outer sheath with the desired diameter, illuminating the hardened outer protective sheath by a light radiation which passes through the sheath to irradiate the filing compound and cross-link the filling compound following the formation of the outer sheath.

2. A method according to claim 1, wherein the protective sheath is selected of a material from a group consisting of polyetherimide, polycarbonate, and polyvinyl chloride polyamide.

3. A method according to claim 1, wherein the step of extruding the sheath forms a sheath with a wall thickness in the range of 0.1 mm–2 mm.

4. A method according to claim 1, wherein the filling compound forms a glide layer in its cross-linked condition.

5. A method according to claim 1, wherein the irradiation of the filling compound causes the filling compound, in the final condition, to have a viscosity in the range of between 10,000 m Pa s and $2 \times 10^6$ m Pa s.

6. A method according to claim 1, wherein the filling compound prior to irradiation has a viscosity in a range of between 10 m Pa s and $30 \times 10^3$ m Pa s.

7. A method according to claim 6, wherein the step of irradiating the filling compound provides a filling compound in the final condition having a viscosity in the range of 10,000 m Pa s and $2 \times 10^6$ m Pa s.

8. A method according to claim 1, wherein the filling compound is formed of a silicone resin.

9. A method according to claim 1, wherein the filling compound includes a mixture of oil.

10. A method according to claim 9, wherein the filling comppound is formed of a silicone resin and the oil is a silicone oil.

11. A method according to claim 1, which further includes, subsequent to irradiating the protective sheath with light energy, applying a second protective sheath onto the first-mentioned protective sheath.

12. In a method of manufacturing a light waveguide cable having a protective sheath containing a bundle of at least one light waveguide with a partially cross-linkable filling compound, said method comprising the steps of providing a bundle with the filling compound and then extruding a sheath on said bundle to form the light waveguide cable, the improvements comprising the step of extruding provides a sheath of at least a partially light permeable material of a diameter larger than the desired final diameter, said method include drawing the extruded sheath of the larger diameter into a stretch cone with a small diameter of a final diameter for the sheath, hardening the sheath of the final diameter and subsequently cross-linking the filling compound by irradiating the hardened sheath with light radiation, which passes through the sheath to cross-link the filling compound.

13. In a method according to claim 12, which further includes applying a second outer sheath on the first-mentioned sheath by extruding the second sheath onto the first-mentioned sheath after the step of cross-linking the filling compound.

14. In a method according to claim 12, wherein the step of extruding the sheath extrudes the sheath comprising a material selected from a group consisting of polyetherimide, polycarbonate and polyamide, and said step of extruding extrudes the sheath having a wall thickness of between 0.1 and 2 mm.

* * * * *